United States Patent [19]

Dröscher et al.

[11] Patent Number: 4,581,398

[45] Date of Patent: Apr. 8, 1986

[54] HYDROLYSIS-RESISTANT THERMOPLASTIC MOLDING COMPOSITION COMPRISING HIGH MOLECULAR WEIGHT POLYBUTYLENE TEREPHTHALATEPOLYESTER AND A DICARBOXYLIC ACID SALT

[75] Inventors: Michael Dröscher, Dorsten; Horst Heuer, Haltern, both of Fed. Rep. of Germany

[73] Assignee: Huels Aktiengesellschaft, Marl, Fed. Rep. of Germany

[21] Appl. No.: 614,927

[22] Filed: May 29, 1984

[30] Foreign Application Priority Data

May 28, 1983 [DE] Fed. Rep. of Germany ....... 3319501

[51] Int. Cl.$^4$ ............................................... C08L 67/02
[52] U.S. Cl. ..................................... 524/161; 524/166; 524/394; 524/396; 524/400; 524/748; 524/774; 524/775; 524/777; 528/275
[58] Field of Search ............... 524/161, 166, 394, 396, 524/400, 748, 774, 775, 777; 528/275

[56] References Cited

U.S. PATENT DOCUMENTS 3,657,180 4/1972 Cohn .................................. 524/775
4,483,976 11/1984 Yamamoto et al. ................ 528/275

FOREIGN PATENT DOCUMENTS 1320520 6/1973 United Kingdom .

OTHER PUBLICATIONS

David H. Abrahams, Basic Dyeable Polyester: Problem-Solving Tips, American Dyestuff Reporter, Oct., 1970.
Grobe et al., Die Makromolekulare Chemie, 176, 2839 (1975).

Primary Examiner—Maurice J. Welsh
Attorney, Agent, or Firm—Millen & White

[57] ABSTRACT

Hydrolysis-resistant, thermoplastic molding compositions are made from high-molecular weight, linear polybutylene terephthalate and 0.1–10 mole %, based on the amount of the dicarboxylic acid component of the polyester, of a salt of Formula (A)

$$[(-O_3S)_xR-CO_2^-)_2]M, \quad (A)$$

wherein
M is an alkali or alkaline earth metal cation,
R is an aromatic or cycloaliphatic residue or an aliphatic residue of 2–20 carbon atoms in the carbon chain, and
x is 0 or 1.

15 Claims, No Drawings in the presence of catalysts (Sorensen and Campbell, Preparative Methods of Polymer Chemistry, Interscience Publishers Inc., NY, 1961, pp. 111-127; "Kunststoff-Handbuch" [Plastics Manual], Vol. VIII, C. Hanser Verlag, Munich, 1973; or Journal of Polymer Science, Part A 1, 4: 1851-1859, 1966, all of whose disclosures are incorporated by reference herein. Molecular weights are usually in the range of 30 000-60 000 g/mol (weight average).

The timing of the addition of the salts of Formula (A) is uncritical. The addition can take place at any desired point during the preparation of the polyesters. It is also easily possible to introduce the salts into the polyester as late as during ancillary processing (recondensation, addition of auxiliary agents and additives etc.).

Customary additives and auxiliary agents, such as pigments, processing aids, fillers and reinforcements, hydrolysis-, thermal-, or UV-stabilizers, can also be incorporated during manufacture or during subsequent preparation of the finished, treated molding compositions.

After addition of the salts of Formula (A), the molding compositions of this invention exhibit excellent recondensation qualities. For example, using them, recondensation proceeds very rapidly, producing products of a high viscosity number ($>120$ cm$^3$/g), e.g., as required especially for the manufacture of molded articles according to the injection-molding or extrusion processes. Furthermore, the molding compositions of this invention are distinguished by a superior hydrolysis resistance; in other words, molded parts produced from them have a very good hot-water stability, e.g., values of hydrolysis as defined below of about 0.5-20%. This fact is surprising insofar as copolyalkylene terephthalates containing monosodium-5-sulfoisophthalate as the co-component, are said to have a pronounced susceptibility to hydrolysis (Amer. Dyest. Rep. 57: 36 [1970]; "Makromol. Chem." [Macromolecular Chemistry] 176: 2839 [1975]).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The *viscosity number* (J) was determined according to DIN [German Industrial Standard] 16 779, part 2, on solutions of 0.5 g of polybutylene terephthalate in 100 ml of phenol/o-dichlorobenzene (50/50 parts by weight) at 25° C.

The *hydrolysis stability* of the copolyesters is characterized by the reduction in viscosity number (J) after a 24-hour treatment of the finely ground material with 130° C. hot water in a pressure vessel.

The *decrease in viscosity* is defined as percentage reduction of the viscosity number (J) due to the hydrolysis:

$$\frac{J_o - J_{Hydr.}}{J_o} \times 100$$

($J_o$=starting viscosity number; $J_{Hydr.}$=viscosity number after hydrolysis test).

Experiments denoted by letters are not in accordance with the invention.

EXAMPLES

I. Preparation of Molding Compositions of Invention

A. Experiments 1-6 and 13-18, Respectively

In a 100-liter reactor, 200 moles of a mixture of dimethyl terephthalate and 5-sulfoisophthalic acid trisodium salt (content listed in tables) is transesterified with 27 kg (300 moles) of 1,4-butanediol and 15 g of titanium tetraisopropylate as the catalyst in a weak nitrogen stream, first for 3 hours at 160° C., then for 2 hours at 200° C. under agitation until the methanol quantity theoretically to be expected has been removed by distillation.

Thereupon, during the course of 2 hours, a water-jet vacuum is applied; within another 1.5 hours, the reaction mixture is then heated under stirring to 250° C. These conditions are maintained for 30 minutes; subsequently, a vacuum is applied of $<1$ mbar, and the reaction mixture is polycondensed to a viscosity number (J) of 95-120 cm$^3$/g. After eliminating the vacuum with N$_2$, the melt is discharged in rod shape, cooled in water, granulated, and dried. The output of polyester is about 45 kg of granulated material. If desired, the granulated material is furthermore ground into a powder.

B. Experiment 7

In a discontinuously operating laboratory kneader, 1 mol-% (based on the dicarboxylic acid component) of 5-sulfoisophthalic acid trisodium salt is mixed in the melt with polybutylene terephthalate (J: 110 cm$^3$/g) at 250° C. Processing of the melt takes place according to (A).

C. Experiments 8-12

The polyesters are produced according to (A), except that the salts indicated in Table 2 are utilized in place of 5-sulfoisophthalic acid trisodium salt. The products are used as powders.

D. Experiments A through C

The polyesters are prepared according to (A)—but without the addition of a salt according to this invention.

E. Experiments D through F

For comparison, a polyethylene terephthalate is produced according to (A). The catalyst for the transesterification stage is 15 g of Mn acetate and 3.3 g of Co acetate; and 43 g of triphenyl phosphate and 1.1 g of GeO$_2$ (dissolved in ethylene glycol) are used as the catalysts for the polycondensation stage. As contrasted to the mode of operation according to (A), the transesterification is conducted in the first temperature stage at 180° C., and the polycondensation is effected at 280° C.

II. Recondensation

Recondensation of the products for Experiments 1, 2, and (A) takes place in a 500-l tumbler dryer in a water-jet vacuum at 210° C. The products for Experiments 3-7 and (B), finely ground in a laboratory mill, are recondensed in a rotary evaporator under an oil pump vacuum at 210° C.

HYDROLYSIS-RESISTANT THERMOPLASTIC MOLDING COMPOSITION COMPRISING HIGH MOLECULAR WEIGHT POLYBUTYLENE TEREPHTHALATEPOLYESTER AND A DICARBOXYLIC ACID SALT

BACKGROUND OF THE INVENTION

This invention relates to hydrolysis-resistant, thermoplastic molding compositions made of high-molecular weight, linear polybutylene terephthalate.

Polybutylene terephthalates are excellent materials for the manufacture of films, sheets, molded parts, etc. When used to manufacture molded parts by the injection-molding or extrusion methods, in particular, polybutylene terephthalate must have a viscosity number of $>120$ cm$^3$/g.

Polybutylene terephthalates are customarily produced by transesterification or esterification and subsequent polycondensation of terephthalic acid or its polyester-forming derivatives and an alkanediol in the presence of catalysts. According to these processes, conducted in the melt, viscosities of the required magnitude, for example, for injection-molding and extrusion purposes, cannot be attained since, because of the thermal load, decomposition reactions occur as early as in the polycondensation stage so that the desired high viscosity cannot be reached. Another limitation on the viscosity of the polyesters in the melt condensation process results from the viscosity of the melt. The latter increases with progressive polycondensation, making it difficult or even impossible for the volatile, low-molecular weight reaction products to escape, thereby inhibiting the polycondensation progress. Furthermore, technical difficulties are encountered in discharging the high-viscosity melt from the reaction vessel (DOS No. 2,117,748).

If necessary, a solid-phase recondensation is carried out (British Pat. No. 1,066,162; U.S. Pat. No. 3,405,098). This is done by bringing the polyester, in granulated or powdered form, to temperatures ranging from 10°-60° C. below the melting point. In this temperature range, the polybutylene terephthalate is treated under an inert gas stream or under vacuum until the desired, high viscosity has been achieved. The recondensation can be effected either discontinuously, e.g., in a tumbler dryer (DOS No. 2,117,748), or continuously, for example in a fluidized-bed procedure (DOS No. 1,804,551) or in a screw-type reactor (DOS No. 2,162,618). A basic disadvantage of the solid-phase recondensation is derived from the long reaction period at elevated temperature; as a result, although a polybutylene terephthalate of the desired viscosity is obtained, it is already damaged to such an extent that it is greatly decomposed during melt processing. Molded components made of such a material are brittle and prone to breakage.

Therefore, it has been proposed to utilize polybutylene terephthalate in ground form to reduce the recondensation period; however, this process is not economical. Furthermore, there is a danger of caking of the powder (DOS's No. 2,152,245 and 2,117,748). German Pat. Nos. 3,033,468 and 3,033,469 propose a method wherein recondensation is conducted in the presence of alkanediols in two stages. This process has the drawback that it consumes a large amount of time.

SUMMARY OF THE INVENTION

Accordingly, it is an object of this invention to avoid or ameliorate the aforedescribed disadvantages while maintaining the desired good properties of polybutylene terephthalate.

It is another object of this invention to provide a method of accomplishing this while also providing a product having very good hydrolysis resistance.

These objects have been attained by adding to a polybutylene terephthalate, 0.1–10 mole %, based on its content of dicarboxylic acid component, of a salt of Formula (A)

$$[(^-O_3S)_xR-CO_2^-)_2]M, \qquad (A)$$

wherein
M = an alkali or alkaline earth metal cation selected in kind and number to provide electrical neutrality,
R = an aromatic, cycloaliphatic, or aliphatic residue of 2–20 carbon atoms in the carbon chain, and
x = 0 or 1.

DETAILED DISCUSSION

The molding compositions of this invention preferably contain 0.5–2.5 mole % of salts of Formula (A) based on the number of moles of the dicarboxylic acid component in the polybutylene terephthalate.

Suitable aromatic-containing salts of Formula (A) include alkali and alkaline earth metal salts of, for example, 5-sulfoisophthalic acid (SIPS)—e.g., Na$_3$[SIPS], K$_3$[SIPS], NaK$_2$[SIPS], NaMg[SIPS], NaCa[SIPS], KCa[SIPS]—as well as the corresponding salts of sulfo-substituted phthalic and terephthalic acids and also the non-sulfo-substituted iso- and terephthalic acids, as well as unsubstituted phthalic acid. Sulfo-substitution in other positions is also included. Suitable aliphatic dicarboxylic acids are those of alkyl groups of 2–20 carbon atoms in the carbon chain, for example, oxalic acid, succinic acid, adipic acid, dodecanedioic acid, etc. and their sulfo-substituted counterparts. Suitable cycloaliphatic salts are the hexahydro derivatives corresponding to the aromatic salts discussed above, e.g., cyclohexyl derivatives based on tetraline.

Preferred salts are the alkali and alkaline earth metal salts of isophthalic acid and 5-sulfoisophthalic acid. Besides single salts, it is also possible to use mixed salts or salt mixtures.

Suitable polyesters primarily include homopolybutylene terephthalate.

Up to 20 mole %, preferably 5–15 mole %, of the terephthalic acid in polybutylene terephthalate can be replaced by aromatic, cycloaliphatic, or aliphatic dicarboxylic acids. Examples of suitable dicarboxylic acids include isophthalic acid, phthalic acid, cyclohexane-1,4-dicarboxylic acid, adipic acid, sebacic acid, azelaic acid, decanedicarboxylic acid, or similar compounds. Up to 20 mole %, preferably 5–15 mole % of the 1,4-butanediol can be replaced by other diols, e.g., ethylene glycol, 1,3-propanediol, 1,6-hexanediol, neopentyl glycol, 1,4-dimethylolcyclohexane, 1,12-dodecanediol, or similar compounds. See, e.g., British Pat. No. 1,320,520 whose disclosure is incorporated by reference herein.

The polybutylene terephthalate employed according to this invention can be produced in the usual way by transesterification or esterification and subsequent polycondensation of terephthalic acid or its polyester-forming derivatives, as well as the corresponding alkanediol

TABLE 1

| | | Recondensation | | |
|---|---|---|---|---|
| | Content of Na₃[SIPS]* | $J$ [cm³/g] after a Recondensation Period of [h] | | |
| Experiment | [mol-%] | 0 | 6 | 24 |
| Granulate | | | | |
| 1 | 1.0 | 98 | 178 | 276 |
| 2 | 2.5 | 95 | 179 | 252 |
| A | 0 | 95 | 156 | 220 |
| Powder | | | | |
| 3 | 0.5 | 120 | 338 | 482 |
| 4 | 1.0 | 120 | 330 | 490 |
| 5 | 2.5 | 112 | 258 | 418 |
| 6 | 5.0 | 95 | 214 | 348 |
| 7 | 1.0 | 106 | 258 | 354 |
| B | 0 | 118 | 190 | 280 |

*[SIPS] = 5-Sulfoisophthalate

TABLE 2

| | Salt | Recondensation | | |
|---|---|---|---|---|
| | | Content | $J$ [cm³/g] after a Recondensation Period of [h] | |
| Experiment | | [mol-%] | 0 | 6 | 24 |
| 8 | NaK₂[SIPS]* | 1.0 | 118 | 266 | 370 |
| 9 | NaCa[SIPS]* | 1.0 | 120 | 275 | 422 |
| 10 | Na₂ Isophthalate | 1.0 | 115 | 232 | 378 |
| 11 | Na₂ Isophthalate | 2.5 | 113 | 248 | 408 |
| 12 | Na₂ Oxalate | 1.0 | 120 | 278 | 486 |

*[SIPS] = 5-Sulfoisophthalate

TABLE 3

| | | Recondensation and Hydrolysis Stability | | | |
|---|---|---|---|---|---|
| | Content of Na₃[SIPS]* | $J$ [cm³/g] after a Recondensation Period of [h] | | | Decrease in Viscosity |
| Experiment | [mol-%] | 0 | 6 | 24 | [%] |
| D | 0 | 95 | 122 | 149 | 65 |
| E | 1.0 | 79 | — | — | 62 |
| F | 2.5 | 78 | 120 | 150 | 62 |

*[SIPS] = 5-Sulfoisophthalate

TABLE 4

| | Hydrolysis Stability | | |
|---|---|---|---|
| | Content of Na₃[SIPS]* | $J_0$ | Decrease in Viscosity |
| Experiment | [mol-%] | [cm³/g] | [%] |
| 13 | 0.5 | 158** | *** |
| 14 | 1.0 | 98 | 12 |
| 15 | 1.0 | 162** | 3 |
| 16 | 2.5 | 95 | 11 |
| 17 | 2.5 | 178** | 8 |
| 18 | 2.5 | 242** | 7 |
| C | 0 | 109 | 45 |

*[SIPS] = 5-Sulfoisophthalate
**Recondensed at 210° C. under a water-jet vacuum.
***Viscosity number increases.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A hydrolysis-resistant, thermoplastic molding composition comprising high-molecular weight, linear polybutylene terephthalate polyester and 0.1–10 mole %, based on the molar content of the dicarboxylic acid component of the polyester, of a salt of the formula $$[(^-O_3S)_xR-CO_2^-)_2]M,$$

wherein
M is an alkali or alkaline earth metal cation chosen in kind and amount to render the salt electrically neutral,
R is phenyl, cyclohexyl, or an alkyl group of 2–20 carbon atoms, and
x is 0 or 1.

2. A molding composition of claim 1, wherein the amount of said salt is 0.5–2.5 mole %, on the same basis.

3. A molding composition of claim 1, wherein said salt is an alkali metal salt of 5-sulfoisophthalic acid.

4. A molding composition of claim 1, wherein said salt is an alkali metal or alkaline earth metal salt of isophthalic acid.

5. A molding composition of claim 1, wherein said salt is a mixed salt of alkali and alkaline earth metal cations.

6. A molding composition of claim 1, wherein said salt component comprises a mixture of salts of said formula.

7. A molding composition of claim 1, wherein M is $Na^{+1}$, $K^{+1}$, $Mg^{+2}$ or $Ca^{+2}$.

8. A molding composition of claim 1, wherein R is cyclohexyl, phenyl or $C_{2-20}$-alk-α,ω-diyl.

9. A molding composition of claim 1, wherein x is 0.

10. A molding composition of claim 1, wherein x is 1.

11. A molding composition of claim 1, wherein the polyester is homopolybutylene terephthalate.

12. A method for producing a polybutylene terephthalate having good hydrolysis resistance, comprising including in the polymerization medium used to prepare the polybutylene terephthalate 0.1–10 mole %, based on the molar content of the dicarboxylic acid component of the polyester, of a salt of the formula $$[(^-O_3S)_xR-CO_2^-)_2]M,$$

wherein
M is an alkali or alkaline earth metal cation chosen in kind and amount to render the salt electrically neutral,
R is phenyl, cyclohexyl, or an alkyl group of 2–20 carbon atoms, and
x is 0 or 1.

13. In a film, sheet or molded part comprising polybutylene terephthalate, the improvement wherein the latter is a composition of claim 1.

14. A molding composition of claim 3 wherein said salt is 5-sulfoisophthalic acid trisodium salt.

15. A method for improving the hydrolysis resistance of a polybutylene terephthalate consisting essentially of incorporating in the molding composition an amount, effective for improving hydrolysis resistance, of a salt of the formula $$[(^-O_3S)_xR-CO_2^-)_2]M, \qquad (A)$$

wherein
M is an alkali or alkaline earth metal cation chosen in kind and amount to render the salt electrically neutral,
R is phenyl, cyclohexyl, or an alkyl group of 2–20 carbon atoms, and
x is 0 or 1.

* * * * *